April 8, 1958  H. W. ROEBER  2,829,761
GLASS COLLET LOADER FOR TURNTABLE
Filed May 6, 1957  2 Sheets-Sheet 1

INVENTOR
HENRY W. ROEBER
BY Michael Hertz
ATTORNEY

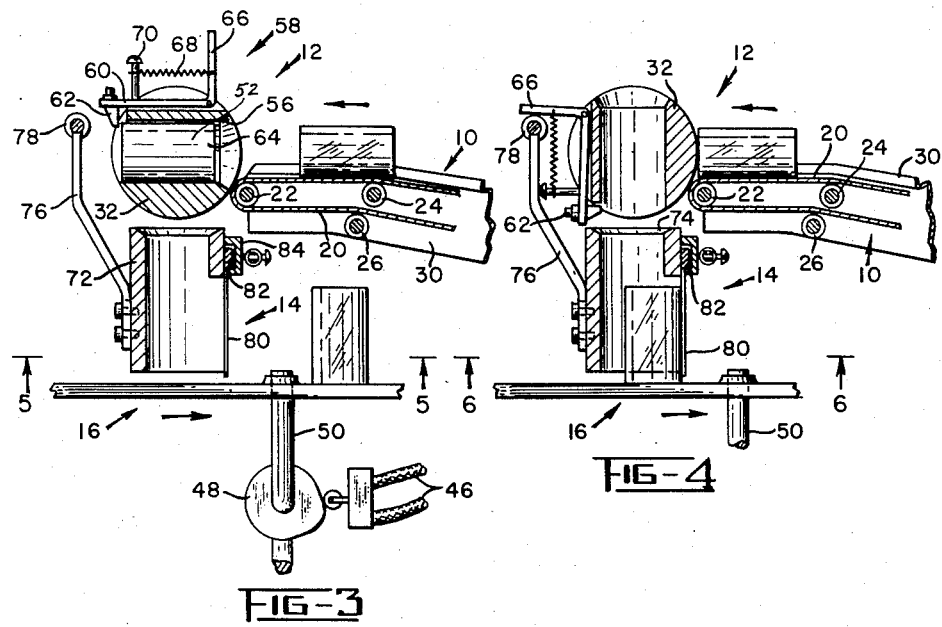

United States Patent Office 2,829,761
Patented Apr. 8, 1958

2,829,761

GLASS COLLET LOADER FOR TURNTABLE

Henry W. Roeber, Emporium, Pa., assignor to Sylvania Electric Products Inc., a corporation of Massachusetts Application May 6, 1957, Serial No. 657,182

3 Claims. (Cl. 198—33)

This invention relates to cylindrical object transfer mechanism, such as metal or glass cylinders or collets.

In the manufacture of envelopes for electrical devices there are utilized hollow cylinders or collets of metal or glass which are cut off from a long cylindrical tube or cane. These cylinders are fed onto the work holders of a forming machine. To facilitate the feeding of the cylinders or collets to the work holders there is provided a turntable onto which the cylinders or collets are delivered in an upstanding position and from which they are removed and placed into the holders. It the cylinders should not be in upstanding position on the turntable, difficulty in feeding the cylinders to the holders is experienced.

It is an object of the invention to provide means to feed the collets or cylinders to the turntable and to insure that they are delivered in an upright position on the turntable.

It is a further object of the invention to provide means whereby the collets are restrained from motion with the turntable as they are delivered thereto until after they have been steadied long enough to insure they will not fall over.

These and other objects will become apparent after reading the following specification and claims, when taken in conjunction with the accompanying drawing in which:

Fig. 3 is a section on the line 3—3 of Fig. 1.

Fig. 4 is a section on the line 4—4 of Fig. 2.

Fig. 5 is a section on the line 5—5 of Fig. 3, and

Fig. 6 is a section on the line 6—6 of Fig. 4.

In general, the transfer mechanism comprises a conveyor belt 10 having upper and lower runs, the runs travelling in the direction of the arrows, a collet turning mechanism 12 for receiving the collets from the conveyor and for rotating collets 90° about their transverse axes, and a chute mechanism 14 for receiving the rotated collets from the collet turning mechanism and holding them steady on an underlying transporting means which may be a turntable 16.

Figure 1:
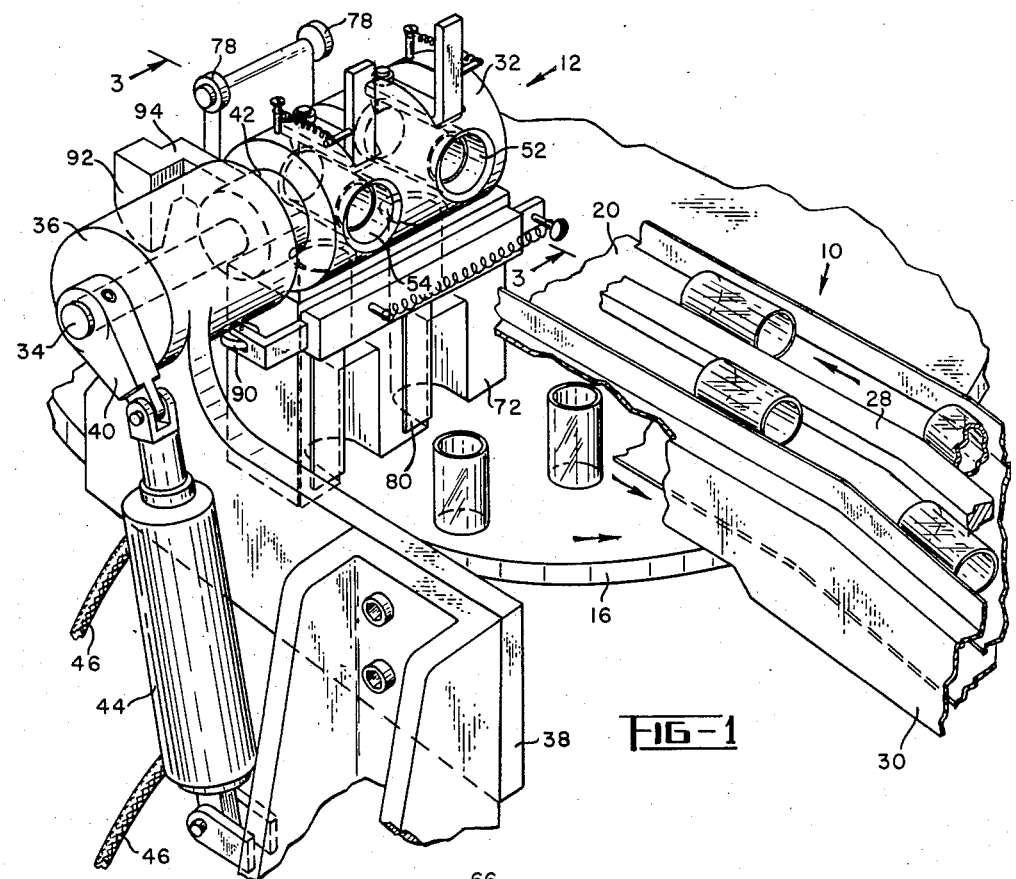
Fig. 1 is a perspective view of the cylinder or collet delivering mechanism with parts broken away for better clarity of illustration.

The conveyor is here shown as having a belt 20 guided about an idler drum 22, Figs. 3 and 4, and direction changing drums 24, 26 and driven by any suitable means. The upper surface of the belt, see Fig. 1, is divided into two conveyor sections by a rib 28 supported in any desired manner immediately above the upper run of the belt. At the sides of the belt are a pair of rails 30 with offset portions therein, the rails being suitably supported from the machine frame. The two runs of the belt lie between these rails. The drums 22, 24 and 26 are journaled in the rails 30.

The collet rotating mechanism 12 is situated at the bight of the conveyor, opposite the drum 22. It comprises a body, as, for example, a cylinder 32 whose axis lies in a horizontal plane. The cylinder has rigid therewith a long longitudinal axle 34 extending from one end thereof, this axle being journaled in a long pillow block 36 integral with the frame 38 of the machine. An oscillating arm 40 is fastened to one end of the shaft and a cam carrying hub 42 is fastened to the shaft between the block 36 and the cylinder. Thus oscillation of the arm 40 oscillates the shaft and with it the hub 42 and cylinder 32. The arm is oscillated by a fluid motor 44 interconnected between the arm 40 and the frame, and energized through conduits 46 under control of a valve controlling cam 48 on the shaft 50 which drives the turntable 16.

The cylinder 32 has two transverse bores 52 and 54 therein which, in the position of the cylinder shown in Fig. 3, are opposite the upper runs of the belt 20. The bores have flaring mouths 56 to facilitate feeding of the collets into the bores. The cylinder has pivoted on its exterior surface a pair of bell crank levers 58, one for each bore, each lever having one arm 60 normally spring urged to lie in a groove in the cylindrical wall, there being a stop 62 at the end of the arm, the stop overlapping the bore to prevent the glass collet 64 within the bore from being projected beyond the periphery of the cylinder. The second arm 66 of the bell crank lever extends perpendicularly to the arm 60 and the bell crank is spring held to the position shown in Fig. 3 by a spring 68 tensioned between the arm 66 and a pin 70 fixed to the cylinder.

Below the cylinder and suitably supported from the machine frame is a block 72 within which are the chutes which have been generally indicated as 14. Each chute registers with a bore in the cylinder when the cylinder is rotated through 90° to the position shown in Fig. 4 and each chute has a flaring mouth 74 to easily receive a glass collet as the same is released from the bore in the cylinder.

Figure 2:
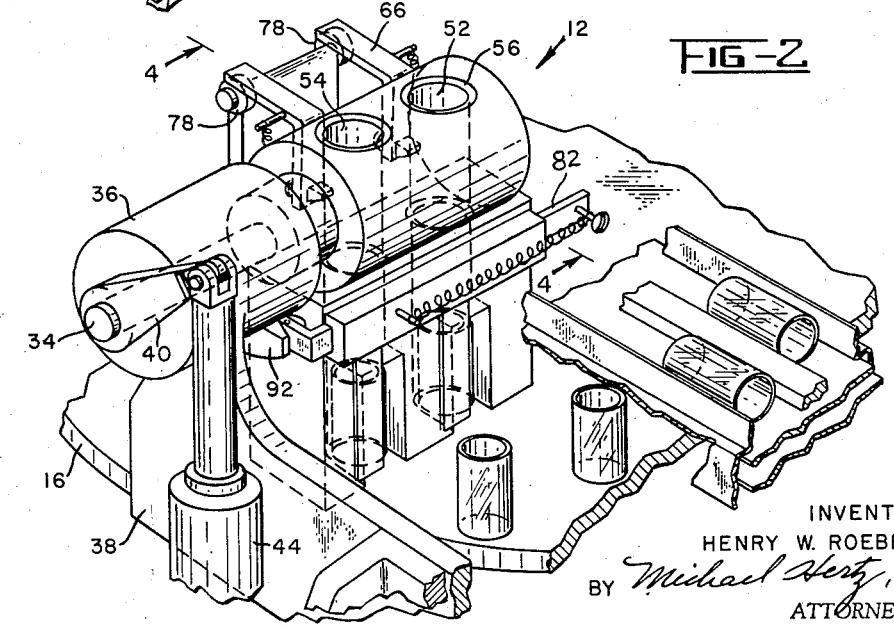
Fig. 2 is a similar view, with parts of the mechanism in shifted relation.

Rigidly mounted on a vertical wall of the block 72, see Figs. 3 and 4, is a fixed frame 76 carrying a shaft on its upper end and on which are journaled two antifriction rollers 78. On rotation of the shaft 34, see Fig. 4, the cylinder will be rotated to not only align the bores in the cylinder with the chutes, but to bring the arms 66 into contact with the rollers 78 and by continued rotation of the cylinder move the stops 62 out of the path of the bores to allow collets therein to drop into the chutes. The collets will come to rest with their lower bases riding on the turntable 16. A collet however will not immediately be carried out of its hopper by the turntable but will remain at rest therein until the cylinder is rotated in clockwise direction from the position of Figs. 2 and 4 because of gate mechanism to be described. This rest period of the collets within the chutes allows them to become steady and thus not topple over when finally they are released from the chutes for movement with the turntable.

The front of each hopper is open or devoid of a wall, as can be clearly seen in Fig. 1 and the various sectional views. To prevent the collets from leaving the chutes prematurely, there is utilized a gate mechanism. This comprises a pair of vertical gates 80 whose upper ends are secured to a slide 82 slidable in a channel way 84 fixed to the block 72. The gates are normally held in the inoperative retracted position shown in Fig. 5 by a spring 86 tensioned between a pin fixed to the slide and a second pin fixed to the channel way. The slide has a bent arm 88 carrying an antifriction roller 90 which when engaged by a cam 92 shifts the slide and its gates to chute closing position. The cam 92 is on the end of an offset arm 94 fast with the hub 42. As the cylinder 32 rotates to the position shown in Figs. 2, 4 and 6, the cam 92 engages the roller 90 and shifts the bar and gates to chute closing position. Thus collets which have been released to the chutes are restrained from being carried out of the chutes by turntable rotation until the cylinder begins to return to its Fig. 3 position. Soon after return rotation of the cylinder has begun, the now steadied collets leave the chutes and are carried around by the turntable toward peg loading position of the turntable.

While the cylinder is in the Fig. 4 position, a next collet on the belt is brought into abutment with the cylindrical surface of the cylinder ready to be forced into the bore of the cylinder by belt movement when the cylinder is returned to its Fig. 3 position. The timing of delivering of the collets to the mouth of the bores can be made to coincide with bore presentation by gating mechanism associated with the belt not necessary to disclose here; but such gate mechanism is not necessary since it is found in practice, with the flaring mouth of the bores, no excessive crowding of collets into the bores takes place, and each oscillation of the bore will receive and rotate one collet, leaving others behind on the moving belt.

Having thus described the invention, what is claimed is:

1. An article transfer device comprising an orientating body rotatable about a horizontal axis and having a bore transverse to said axis, means for feeding an article into said bore, means for rotating the body on its axis, means temporarily restraining the article from passing through the bore, and means at the end of rotation of the body for removing the restraining means.

2. An article transfer device comprising an orientating body rotatable about a horizontal axis and having a bore transverse to said axis, means for feeding an article into said bore while said bore is on a horizontal axis, means for rotating the body through an angle of 90°, a vertical chute registering with the bore when the bore is in vertical position, said chute having an open front wall, a gate for closing off the front wall, an article receiving and transporting means below the chute and movable in a direction to remove the article from said chute through said open front wall, means operative, as the bore in the body is brought to vertical position, to shift the gate to front obstructing position, and means to shift the gate non-obstructing position as the bore is turned to a horizontal axis position.

3. An article transfer device comprising an orientating body rotatable about a horizontal axis and having a bore transverse to said axis, means for feeding an article into said bore while said bore is on a horizontal axis, means for rotating the body through an angle of 90°, a vertical chute registering with the bore when the bore is in vertical position, said chute having an open front wall, a gate for closing off the front wall, an article receiving and transporting means below the chute and movable in a direction to remove the article from said chute through said open front wall, means operative as the bore in the body is turned to vertical position to shift the gate to front obstructing position, a means temporarily restraining the article from passing through the bore during rotation of the body and means at the end of body rotation to vertical bore position to remove the restraining means.

References Cited in the file of this patent

UNITED STATES PATENTS 2,732,057     Temple _____ Jan. 24, 1956

FOREIGN PATENTS 603,819     Great Britain _____ June 23, 1948